Patented Oct. 21, 1941

2,259,754

UNITED STATES PATENT OFFICE 2,259,754

CONVERSION OF HYDROCARBONS

Edwin T. Layng, Jersey City, N. J., assignor to The Polymerization Process Corporation, Jersey City, N. J., a corporation of Delaware No Drawing. Application June 1, 1939, Serial No. 276,810

6 Claims. (Cl. 196—10)

This invention relates to catalytic contact material for the conversion of olefinic hydrocarbons to hydrocarbons of higher boiling points. More particularly, the invention relates to a catalytic contact agent for the polymerization of low-boiling olefinic hydrocarbons, particularly normally gaseous olefinic hydrocarbons, to hydrocarbons of higher boiling points to produce a motor fuel of high anti-knock value.

Copper pyrophosphate may be employed to promote the conversion of olefinic hydrocarbons to higher boiling hydrocarbons. However, in the use of copper pyrophosphate produced by customary methods it is necessary to subject the material to a special conditioning treatment in order to initiate its activity as a polymerization catalyst.

In the production of copper pyrophosphate by the reaction in aqueous solution of a soluble copper salt and a soluble pyrophosphate it has been considered advisable, in order to effect the desired precipitation, to employ an excess of the soluble pyrophosphate, such as sodium pyrophosphate. Copper pyrophosphate made by this method is a valuable catalytic contact agent for the conversion of olefins to higher boiling products but must be subjected to a preliminary conditioning or activation treatment, at a temperature which is substantially higher than those ordinarily employed in the catalytic polymerization of olefins, in order to initiate its catalytic activity. For example, copper pyrophosphate produced by the reaction in aqueous solution of copper sulfate and sodium pyrophosphate, the latter being in excess of the amount necessary to react with all the copper sulfate, according to the equation:

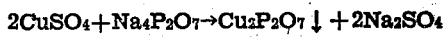
$$2CuSO_4 + Na_4P_2O_7 \rightarrow Cu_2P_2O_7 \downarrow + 2Na_2SO_4$$

is not active for the conversion of gaseous olefins below 400° F. unless it has been subjected to a conditioning or induction period. This conditioning treatment may be effected by passing the reaction gases over the copper pyrophosphate at temperatures which are progressively increased to a point substantially in excess of 400° F. to initiate a substantial rate of conversion. Thereafter the temperature is lowered to the temperature previously selected for optimum conversion conditions.

In connection with the present invention it has been discovered that the necessity for the induction or activation period of the contact agent may be obviated if the conditions of preparation of the copper pyrophosphate are controlled to avoid an excess of the pyrophosphate over the amount necessary to react with the soluble copper salt. It has been discovered that the optimum ratio for the production of the maximum quantity of copper pyrophosphate having high catalytic activity is the stoichiometric ratio of the soluble copper salt and the soluble pyrophosphate corresponding to the previously given equation. In fact, an excess of the soluble copper salt over the amount equivalent to the soluble pyrophosphate is not harmful, and an active catalyst may be prepared under these conditions. However, such a procedure may result merely in a lowered production of catalytic material.

The adverse effect of an excess of the soluble pyrophosphate apparently is caused by the reaction of the excess sodium pyrophosphate with copper pyrophosphate to form a double salt which is soluble in water. The double salt while easily soluble in water is difficult to separate from the precipitated copper pyrophosphate by washing. Apparently it is adsorbed on or occluded by the precipitate. It is the presence of the double salt which makes necessary the extended induction or activation period at high temperature. Apparently the double salt acts as a barrier to the activation of the catalyst which must be overcome by a prolonged treatment with the reaction materials at a temperature above the desired reaction temperature. However, the invention is not to be limited by any theoretical considerations regarding the exact mechanism by which the double salt or even other materials inhibit the activity of the catalyst.

The invention will be described further with reference to the following specific examples which illustrate the effect of the use of an excess of the soluble pyrophosphate in the production of copper pyrophosphate by precipitation.

Example I

A sodium pyrophosphate solution made by dissolving 122.7 grams of $Na_4P_2O_7.10H_2O$ in 1375 cc. of water was added with rapid stirring to a copper sulfate solution made by dissolving 125 grams of $CuSO_4.5H_2O$ in 2500 cc. of water. The mixture was stirred for one hour and then filtered. The filter cake was washed several times with distilled water, dried at 220° F. for 24 hours, and then formed into pellets for use. The catalyst prepared in this manner was tested for the polymerization of a butane-butylene feed stock containing about 24 mol per cent normal butylene and approximately 12 mol per cent isobutylene. The reaction gases were passed over the catalyst in a dry condition at a pressure of 1400 pounds per square inch at a rate of approximately 20 cubic feet of gas per pound of catalyst per hour. The temperature was brought to 300° F. in seven hours with no noticeable conversion occurring. During the next 8 hours the temperature in the reactor was raised from 300 to 350° F. without the initiation of conversion and during a second 8 hour period the temperature of the reaction was raised to 375° F. without result. During a third 8 hour period the temperature was raised to 400° F. with the initiation of conversion at a small rate; that is, the product contained less than 2 weight per cent of liquid. During a fourth 8 hour period the catalyst was raised to 450° F. without substantial increase in the conversion rate. During a fifth 8 hour period the temperature was raised to 475° without apparent effect. During a sixth 8 hour period the temperature was raised to 500° F., whereupon conversion at a substantial rate was initiated. The product collected during this period contained approximately 14 per cent of liquid. Thereafter the temperature was lowered gradually to the operating temperature of 325 to 350° F. During the remainder of the test the product contained 20 to 30 weight per cent of liquid. In the particular test referred to, the passage of gases over the catalyst was continued at the same rate for over 1000 hours without apparent lowering of the conversion rate with the production of approximately 130 gallons of polymer liquid per pound of catalyst used.

In connection with Example I it will be noted that the catalyst, which was made with the use of 10 per cent excess of sodium pyrophosphate, required treatment for approximately 50 hours under polymerization operating conditions before the initiation of a substantial conversion rate was effected. It further required the use of temperatures substantially above the desired operating temperature of 325° to 350° F. and extending upwardly to a maximum of 500° F.

*Example II*

A catalyst preparation using stoichiometric proportions of copper sulfate and sodium pyrophosphate was followed by adding sodium pyrophosphate solution, made by dissolving 111.5 grams $Na_4P_2O_7.10H_2O$ in 2500 cc. of water, to a copper sulfate solution, made by dissolving 125 grams of $CuSO_4.5H_2O$ in 1375 cc. of water, rapidly with stirring. The mixture was stirred for one hour and then filtered. The filter cake was washed several times with water and dried at 110° C. for 24 hours and then pelleted into ⅛ inch pills. The catalyst made in accordance with this example was tested by the passage thereover, at a pressure of 1400 pounds per square inch, of a butane-butylene feed stock containing approximately 28 mol per cent normal butylene and 12 mol per cent isobutylene. The gas was passed over the catalyst at a rate of approximately 35 cubic feet per pound of catalyst per hour. The temperature of the reactor was raised to 325° F. in three hours. In the first 8 hour period thereafter, during which the temperature was held at 325° F., conversion was initiated with the recovery of approximately 2½ weight per cent of liquid from the product. During the second 8 hour period at 325° F. the weight per cent of liquid in the product was 11½ per cent. During the third 8 hour period the conversion rate again increased sharply with the recovery of 29 weight per cent of liquid from the product. Thereafter in the test at 325° to 350° F. this conversion rate was maintained. The particular test under consideration was arbitrarily terminated after 400 hours, with a total liquid production of 99 gallons of liquid per pound of catalyst employed.

Consideration of the above examples makes it clear that the omission of an excess of sodium pyrophosphate in the production of the catalyst in Example II resulted in a substantial decrease in the amount of time necessary for initiating substantial conversion and eliminated the necessity for the use of temperatures above the desired operating temperature. The catalyst of Example I required 55 hours and a maximum temperature of 500° F. to reach the same rate of conversion which was reached in Example II in 16 hours at the operating temperature of 325° F. The advantages which accrue to the use of the catalyst made according to the present invention are clearly apparent. The necessity for unusually high temperatures is eliminated, the time during which the apparatus is employed without production of liquids at a substantial rate is materially reduced, and the amount of feed stock which is necessary to pass over the catalyst before the initiation of substantial conversion is also materially reduced.

When it is desired to prepare the catalyst in larger batches or in more concentrated solution than is employed in Example II it is desirable to take steps necessary to insure uniformity of the reaction throughout the mass in order to prevent formation of the double salt. It is found under these conditions, particularly when using concentrated solutions, that the catalyst prepared requires a higher activating temperature, and in general exhibits characteristics of a catalyst prepared by using an excess of the soluble pyrophosphate salt, unless care is taken to insure complete reaction of the soluble pyrophosphate salt with the copper salt. The presence of the double salt in the catalyst product can be avoided by employing an excess of the copper salt over the amount equivalent to the soluble pyrophosphate, by stirring the pyrophosphate precipitate for some time after the period of completion of the reaction, by digesting the precipitate at elevated temperature with stirring for some time after the apparent completion of the reaction, or by any combination of these steps. For example, when employing reagents approximately twice as concentrated as those of Example II 10 per cent excess of the copper sulfate may be employed. After precipitation the mixture may be stirred for an hour or two longer than usual and may be heated, for example, to 70° C. during this period. In this manner a larger batch of the catalyst may be prepared employing quantities of reagents substantially the same as those of Example II, and the catalyst thus prepared is as active initially as that prepared according to Example II.

I claim:

1. The method of converting olefinic hydrocarbons to hydrocarbons of higher boiling points which comprises contacting said olefinic hydrocarbons under conditions of temperature, pressure and time suitable to effect said conversion with copper pyrophosphate prepared by the reaction of a soluble copper salt and a soluble pyrophosphate in an aqueous solution wherein the ratio of the copper salt to the soluble pyrophosphate is at least equal to the stoichiometric ratio of these compounds whereby said thus-prepared copper pyrophosphate is substantially free from the double salt of copper pyrophosphate and the soluble pyrophosphate and has a materially shorter induction period than a copper pyrophosphate catalyst prepared with an excess of soluble pyrophosphate.

2. The method of converting olefinic hydrocarbons to hydrocarbons of higher boiling points which comprises contacting said olefinic hydrocarbons at elevated temperature with a catalytic contact agent comprising as an essential ingredient copper pyrophosphate prepared by the reaction of a soluble copper salt and a soluble pyrophosphate in an aqueous solution wherein the ratio of the copper salt to the soluble pyrophosphate is at least equal to the stoichiometric ratio of these compounds whereby said thus-prepared copper pyrophosphate is substantially free from the double salt of copper pyrophosphate and the soluble pyrophosphate and has a materially shorter induction period than a copper pyrophosphate catalyst prepared with an excess of soluble pyrophosphate.

3. The method of converting olefinic hydrocarbons to hydrocarbons of higher boiling points which comprises contacting said olefinic hydrocarbons under conditions of temperature, pressure and time suitable to effect said conversion with copper pyrophosphate prepared by the reaction of a soluble copper salt and a soluble pyrophosphate in an aqueous solution wherein the ratio of the copper salt to the soluble pyrophosphate is greater than the stoichiometric ratio of these compounds whereby said thus-prepared copper pyrophosphate is substantially free from the double salt of copper pyrophosphate and the soluble pyrophosphate and has a materially shorter induction period than a copper pyrophosphate catalyst prepared with an excess of soluble pyrophosphate.

4. The method of converting olefinic hydrocarbons to hydrocarbons of higher boiling points which comprises contacting said olefinic hydrocarbons at elevated temperature with a catalytic contact agent comprising as an essential ingredient copper pyrophosphate prepared by the reaction of a soluble copper salt and a soluble pyrophosphate in an aqueous solution wherein the ratio of the copper salt to the soluble pyrophosphate is greater than the stoichiometric ratio of these compounds whereby said thus-prepared copper pyrophosphate is substantially free from the double salt of copper pyrophosphate and the soluble pyrophosphate and has a materially shorter induction period than a copper pyrophosphate catalyst prepared with an excess of soluble pyrophosphate.

5. The method of converting olefinic hydrocarbons to hydrocarbons of higher boiling points which comprises contacting said olefinic hydrocarbons under conditions of temperature, pressure and time suitable to effect said conversion with copper pyrophosphate prepared by the reaction of a soluble copper salt and a sodium pyrophosphate in an aqueous solution wherein the ratio of the copper salt to the sodium pyrophosphate is at least equal to the stoichiometric ratio of these compounds whereby said thus-prepared copper pyrophosphate is substantially free from the double salt of copper pyrophosphate and the sodium pyrophosphate and has a materially shorter induction period than a copper pyrophosphate catalyst prepared with an excess of sodium pyrophosphate.

6. The method of converting olefinic hydrocarbons to hydrocarbons of higher boiling points which comprises contacting said olefinic hydrocarbons at elevated temperature with a catalytic contact agent comprising as an essential ingredient copper pyrophosphate prepared by the reaction of a soluble copper salt and sodium pyrophosphate in an aqueous solution wherein the ratio of the copper salt to the sodium pyrophosphate is at least equal to the stoichiometric ratio of these compounds whereby said thus-prepared copper pyrophosphate is substantially free from the double salt of copper pyrophosphate and the sodium pyrophosphate and has a materially shorter induction period than a copper pyrophosphate catalyst prepared with an excess of sodium pyrophosphate.

EDWIN T. LAYNG.